July 5, 1938.  H. DALLMANN  2,123,038
GAS DENSITY METER
Filed Nov. 10, 1936
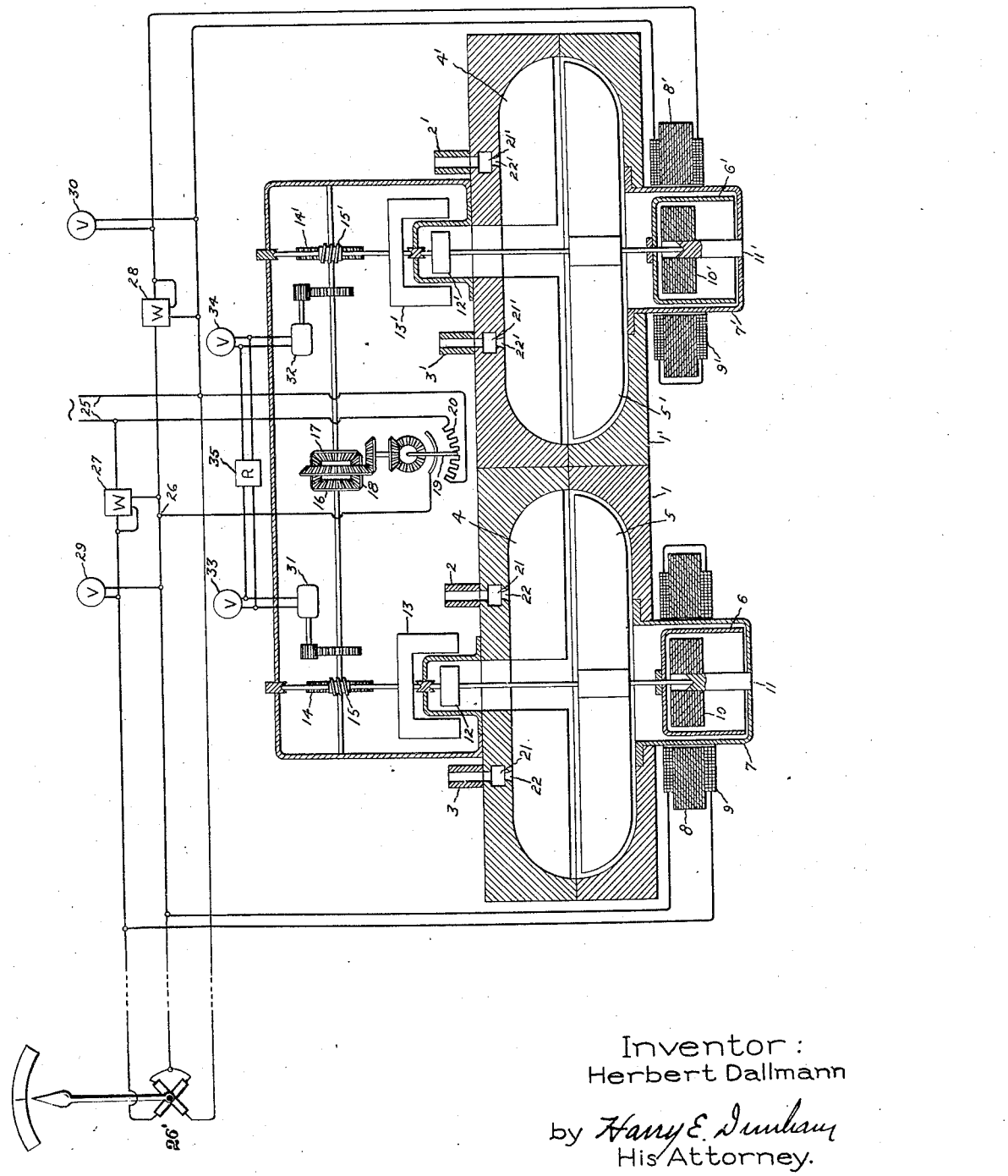
Inventor:
Herbert Dallmann
by Harry E. Dunham
His Attorney.

Patented July 5, 1938

2,123,038

UNITED STATES PATENT OFFICE 2,123,038

GAS-DENSITY METER

Herbert Dallmann, Berlin-Karlshorst, Germany, assignor to General Electric Company, a corporation of New York Application November 10, 1936, Serial No. 110,175
In Germany November 13, 1935

8 Claims. (Cl. 265—44)

My invention relates to gas-density meters and has for its principal object the provision of a relatively accurate gas-density meter of the dynamically-operating type.

Other and further objects and advantages will become apparent as the description proceeds.

In dynamically-operating gas density meters heretofore known, the measurement is obtained by means of the drag or the force transmitted through the gas between a driven rotating wheel and a measuring wheel. The axles penetrate through the walls of the gas chamber and thus lead to a considerable source of error. In accordance with my invention in its preferred form, I eliminate the movable measuring wheel and determine the density from the braking effect experienced by a motor-driven blower wheel in a gas filled chamber which is provided with suitable stationary vanes or counterfans. The necessity for axle penetration is overcome by utilizing a blower motor of such a type that the rotor may be mounted within the gas-receiving chamber. Other conditions being the same, the density of the gas in the chamber determines the speed of the blower wheel. Thus, when supplying a constant power input, one can determine the gas density by observing the speed or, when maintaining a constant speed, one can determine the gas density by observing the power input.

In accordance with a preferred form of my invention, I, furthermore, employ a motor of the Ferraris or induction type for driving the blower wheel. This arrangement gives numerous advantages. In the first place, the measuring accuracy is dependent largely on the characteristic curves of the motor, particularly the relationship between speed and output. That relationship is particularly favorable in induction motors. Furthermore, an induction motor can easily be constructed in such a manner that rotating parts are in the gas-receiving chamber while the field magnets may be placed outside the wall of the gas chamber. The induction motor, therefore, lends itself readily to the elimination of penetration of the axle through the chamber wall. Finally, the motor can be built very compactly, conserving space, so that the complete measuring appliance can be kept down to a handy size.

If desired, the effect of pressure and temperature may be compensated by comparing the density of the unknown gas with that of a known gas. The comparison may be made either by comparing the speeds of the blower motors of two gas-receiving chambers, or by comparing the inputs of two such motors. If desired, an automatic regulator may be employed for equalizing the speeds or outputs of the motors, and the position of the regulator will serve as an indication of the gas-density ratio.

The invention may be understood more readily from the following detailed description when considered in connection with the accompanying drawing and the features of the invention which are believed to be novel and patentable will be pointed out in the claims appended hereto. The single figure of the drawing is a schematic diagram of one embodiment of my invention showing the mechanical parts partially in cross-section.

There is a measuring chamber 1 composed of two halves joined in any suitable manner. The gas to be tested is passed through the chamber 1 by means of connecting pipes 2 and 3. In case the measurement is to be made by a comparison of one gas with another, there is a second chamber 1'. One of the chambers receives a standard gas and the other receives a gas which is to be compared with the standard gas. It will be understood that the chamber 1' is similar in all respects to the chamber 1 and the corresponding parts thereof will be indicated by primed numerals.

In order to produce a reaction to the rotation of the blower wheel, stationary vanes 4 forming the counterfan are provided adjacent the blower wheel or driven fan 5. The blower wheel 5 is rotated by an induction motor having a drum-shaped rotor 6 rigidly connected to the axle of the blower wheel 5. The rotor 6 rotates in a housing 7 preferably composed of pressed or stamped material and forming part of the wall of the chamber 1. Surrounding the housing 7, there is a laminated field structure 8 carrying the exciting winding consisting of the coils 9 while, within the housing, there is a ferromagnetic rotor core or armature 10. A bearing 11 fixed in the housing 7 is provided for supporting the axle of the blower wheel 5. The rotor core 10 may be secured to the bearing 11 and need not be free to rotate. It will be understood that the rotor 6 is composed of electrically-conducting material and the rotating or shifting magnetic field set up by the exciting winding 9 across the air gap between the core elements 8 and 10 will produce rotation of the rotor 6.

In order to avoid shaft penetration for measuring the speed of the rotor, a magnetic coupling may be employed having a rotating part 12 carried by the shaft of the blower wheel 5 within the gas chamber 1 and having a cooperating rotatable part 13 outside the gas chamber. Any suitable mechanism may be connected to the external part 13 of the magnetic coupling for producing an indication of the speed of the blower shaft or for controlling the speed of either driving motor for bringing their speeds or outputs in equilibrium.

In one form of the invention where the gas chambers 1 and 1' are employed for comparing the densities of two gases, a mechanical speed-comparison arrangement is employed for adjusting the motor input to obtain speed equality of the two blower motors. The magnetic coupling part 13 is arranged to drive a worm gear 14 through a worm 15 secured to the part 13 and a differential is provided consisting of a sun wheel 16 mechanically connected to the worm gear 14 and a second sun wheel 17 mechanically connected to a corresponding worm gear 14' forming a part of the apparatus associated with the gas chamber 1'. The differential also includes a planet wheel 18 cooperating with the sun wheels 16 and 17, the wheels 16, 17, and 18 being beveled gears so that a cage carrying the planet wheel 18 is rotated one way or the other until the speeds of the wheels 16 and 17 are equal. The planetary cage carrying the planet wheel 18 is connected to a rheostat arm 19 of a rheostat 20 which is arranged in a suitable manner to control the power input of the rotors 6 and 6' by varying the voltages applied to their stator windings 9 and 9'. The position acquired by the rheostat arm 19 when speed equality is attained serves as an indication of the ratio of the densities of the gases of the chambers 1 and 1'.

In order to guard against disturbances of the reaction on the blower wheel 5 by passage of gas through the chamber 1, a circular header 21 is provided which parallels the gas chamber 1 and has a plurality of nozzles 22 leading to the measuring chamber in order that flow of gas through the chamber 1 will be broken up into fine streams. It will be understood that the pipes 2 and 3 are connected to the circular header 21. The gas is thus diffused through the chamber 1 and the replacement of gas during continuous measuring processes does not affect the reaction of the blower wheel 5.

It will be observed that the chambers 1 and 1' are built integral or intimately joined, they are preferably composed of material serving as a good conductor of heat in order that temperature differences cannot arise between them so as to impair the accuracy of the density comparison.

In one form of automatic arrangement for maintaining equality of speed of the blower wheels 5 and 5', the stator windings 9 and 9' are connected in series to a source of alternating current 25 and the common terminal 26 for the windings 9 and 9' is connected to the rheostat arm 19 while the resistance forming the rheostat 20 is also connected across the alternating current source 25. The arrangement is such that the blower wheel rotating at greater speed in consequence of meeting less resistance causes rotation of the rheostat arm 19 in the direction reducing the voltage applied to the stator winding of the faster motor and increasing the voltage applied to the stator winding of the other motor. The motor torque, of course, decreases with reduction in voltage. Accordingly, the differential will continue to cause rotation of its cage and the rheostat arm 19, readjusting the voltage inputs and speeds of the motors until the speeds are equal.

The setting of the rheostat arm 19 serves as an indication of the gas density ratio and, if desired, this indication may be transmitted to a distance by means of a telemeter of the well known type operating in accordance with the ratio of the voltages in the parts of the rheostat 20 on either side of the contact with the arm 19. For example, a crossed-coil voltage ratio meter 26' may be employed, which is electrically connected to the contact arm 19 and the ends of the rheostat 20. A comparison of gas density may also be made by comparing the power input to the two blower motors by means of watt-meters 27 and 28.

If desired, the comparison of gas densities may also be made upon another basis by dismantling the differential 16, 17, 18 and adjusting the rheostat arm 19 to bring about equality of voltages applied to the stator windings 9 and 9' measured by voltmeters 29 and 30, respectively, and the readings of the wattmeters 27 and 28 may then be compared.

Still another basis of comparison may be employed in which the differential is not employed but the motors are adjusted by means of the rheostat 20 or otherwise to rotate at equal speeds and the power inputs are compared by an observation of the wattmeters 27 and 28.

For comparing the speeds of the two motors, tachometer generators 31 and 32 may be employed which are mechanically connected through suitable gearing to the external magnetic coupling parts 13 and 13', respectively, and electrically connected to tachometer voltmeters 33 and 34 respectively. If desired, the inputs to the blower motors may be equalized by observing the wattmeters 27 and 28 and the speeds may be compared by means of a ratio meter 35 connected to the tachometer generators.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:—

1. A gas-density meter comprising in combination, a gas-receiving chamber, a rotating element within said chamber including fan blades, an inductive motor rotor and an internal magnetic coupling element all coaxial, an induction motor stator external to said chamber in inductive relation with said rotor, a second magnetic coupling element external to said chamber in magnetic relationship with said internal coupling element, and a speed-responsive device mechanically connected to the external element of said magnetic coupling.

2. A gas-density comparator comprising in combination a pair of gas-receiving chambers in which the gases to be compared may be received, rotatable blower wheels in each of said chambers, electric motor rotors in each of said chambers each mechanically connected to the blower wheel in the same chamber, an electric motor stator external to one of said chambers and in inductive relation to the rotor therein, a second electric motor stator external to the other chamber and in inductive relation to the rotor therein, means for equalizing the speeds of the blower wheels, and means for comparing the power of said motors.

3. A gas-density comparator comprising in combination a pair of gas-receiving chambers in which the gas to be compared may be received, rotatable blower wheels in each of said chambers, electric motor rotors in each of said chambers, each mechanically connected to the blower wheel in the same chamber, an electric motor stator external to one of said chambers and in inductive relation to the rotor therein, a second electric motor stator external to the other chamber and in inductive relation to the rotor therein, means for comparing the speeds of said blower wheels, and means for adjusting the power inputs of said motors.

4. A gas-density comparator comprising in combination a pair of gas-receiving chambers in which the gas to be compared may be received, rotatable blower wheels in each of said chambers, electric motor rotors in each of said chambers each mechanically connected to the blower wheel in the same chamber, an electric motor stator external to one of said chambers and in inductive relation to the rotor therein, a second electric motor stator external to the other chamber and in inductive relation to the rotor therein, means for comparing the speeds of said blower wheels, means for adjusting the power inputs of said motors, and a connection between said speed-comparing means and said power input adjusting device so arranged that the power input to the higher speed blower wheel is reduced until speed equilibrium is attained.

5. A gas-density meter comprising in combination, a gas-receiving chamber having stationary vanes therein, a rotatable blower wheel within said chamber positioned to impel gas against said stationary vanes, an electric motor rotor also within said gas-receiving chamber mechanically connected to said blower wheel, an electric motor stator outside said chamber but in inductive relation to said rotor, and means responsive to the braking effect of said blower wheel and vanes on said motor.

6. A gas-density comparator comprising in combination, a pair of gas-receiving chambers each having a blower wheel rotating therein, motors for driving said blower wheels, a differential having sun wheels in operative relation with said blower wheels and a planetary cage moved by the difference in speed of said sun wheels, a rheostat having an arm connected to said planetary cage, and a control circuit for at least one of said motors including said rheostat, whereby the power input of the motor is increased or decreased by the rheostat setting until the differential resets the rheostat to the position of speed equality.

7. A gas-density meter comprising in combination, a gas-receiving chamber, a blower wheel therein and a motor for rotating said blower wheel, connections for ingress and egress of gas, the density of which is to be measured, and a circular header having openings for said connections and having a plurality of nozzles in said header communicating with the interior of said gas-receiving chamber.

8. A gas density comparison device comprising, a pair of chambers for receiving gas samples to be compared, impellers within said chambers, electric motors driving said impellers, a source of current to which said motors are connected in series, a voltage divider connected to said source having a variable tap connected to a common point between said motors, motor speed-responsive apparatus having an arm movable in response to inequality in speed of said motors, said arm being so connected to said tap as to bring about speed equality of said motors, and a voltage ratio instrument connected to the portions of said voltage divider on either side of said tap.

HERBERT DALLMANN.